Jan. 30, 1934.    R. TRUBERT    1,945,454

REMOTE CONTROL DEVICE FOR ELECTRIC MOTORS

Filed Sept. 21, 1931

INVENTOR.
Rene Trubert.
BY William C. Linton.
ATTORNEY.

Patented Jan. 30, 1934

1,945,454

UNITED STATES PATENT OFFICE 1,945,454

REMOTE CONTROL DEVICE FOR ELECTRIC MOTORS

René Trubert, Arras (Pas-de-Calais), France

Application September 21, 1931, Serial No. 564,113, and in France September 24, 1930

8 Claims. (Cl. 172—179)

The present invention relates to a control device intended particularly, but not exclusively, for reversing the direction of rotation of a commutator motor by means of the supply conductors of said motor. The invention is more particularly applicable to toy electric locomotives.

The device according to the present invention comprises as its main feature a principal magnet, which may be the field magnet of the motor and which operates the desired control, for example the reversal of the motor, the armature of the said principal magnet being capable of being locked in one of its positions by an auxiliary device put into operation by a current different from that capable of operating the said principal magnet.

Amongst the advantages of the device of this invention there may be noted:

1st. Its simplicity, robustness, and good operation.

2nd. The possibility of starting the motor immediately in the desired direction, contrary to certain known devices in which the motor changes its direction of rotation at each new start.

3rd. The possibility of regulating the speed of the motor in both directions, contrary to certain known devices in which one direction is always faster than the other. Further, with the latter known device, the regulation is made for determined voltage of the section and if the latter varies, as is frequent in certain localities, certain positions of the control rheostat which ought to cause forward operation, give backward operation, or vice versa. This serious inconvenience cannot exist with the device according to the invention, which uses equally an ordinary rheostat giving first high speed and then slow speed, as in the case of other known devices.

Other features of the invention will appear from the following description, which with reference to the accompanying drawing shows, solely by way of example to make the invention understood, how the latter can be carried into effect.

Figure 4:
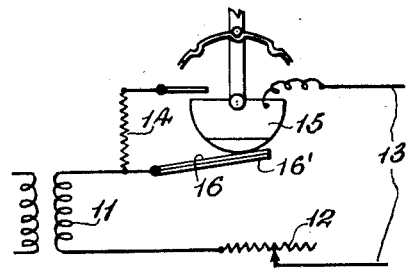
Figure 5:
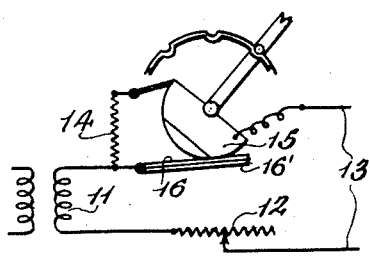
Figure 6:
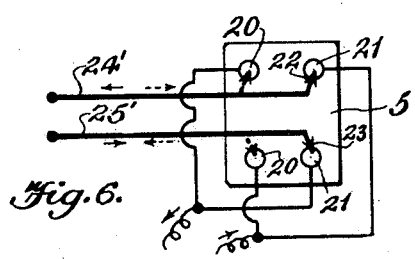

Figure 4 diametrically represents the position of the control switch when the motor is at rest;

Figure 5 diametrically represents the position of the switch when the motor is set for forward motion; and Figure 6 is an enlarged detail of the reversing switch.

Figure 1:
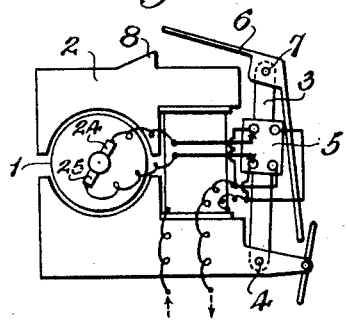
Figure 1 illustrates the improved device in the position of rest.
Figure 2:
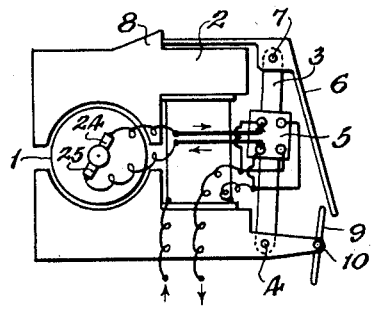
Figure 2 illustrates the device in a position for forward motion.
Figure 3:
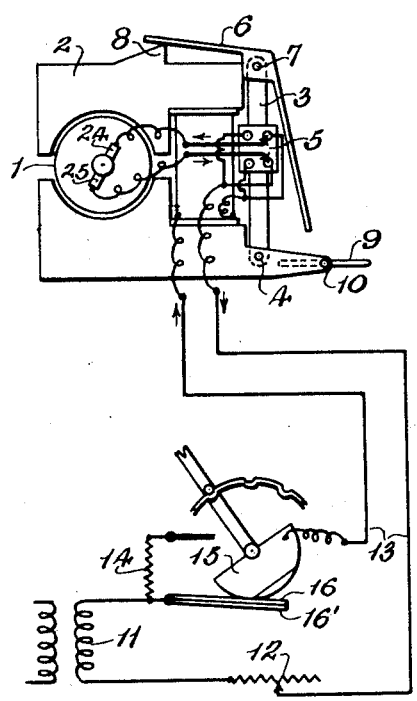
Figure 3 illustrates the device in a position for backward motion and associated with the control switch.

A motor is shown diagrammatically in Figs. 1, 2 and 3 having an armature 1 and field magnet 2. A lever 3 pivoted at 4 adjacent the magnet is adapted for attraction by the latter, either by being made of iron or by carrying an iron armature. The lever 3 is normally away from the magnet, but is attracted by the latter when the motor circuit is established and the operating current supplied. If, for example, the motor runs on 16 volts or above, the lever 3 will be adjusted for attraction by the field magnet 2 if a current at 15 volts or above is applied to the motor.

The lever 3 operates the reversing switch which comprises a plate 5 carried by said lever and having two electrically interconnected sets of contacts 20 and 21, respectively. A pair of contact points 22 and 23, respectively, bear upon the set of contacts 20 or 21 dependent upon whether or not the lever 3 is attracted by the electro-magnet 2.

The contact point 22 is in circuit with the motor brush 24 by means of an electrical connection 24', whereas the contact point 23 is in circuit with the motor brush 25 by means of an electrical connection 25'. In operation of the reversing switch, it will be understood that when the lever 3 is not attracted, the contact points 22 and 23 will engage the contacts 20 of the reversing switch, thus causing the current to pass through the induction in that direction indicated by the arrows in Figure 2, but, when the lever 3 is attracted, the contact points 22 and 23 will engage the contacts 21 of the reversing switch due to the displacement of the latter and thus cause the current to flow through the induction in the opposite direction as indicated by the arrows in Figure 3.

According to the principal feature of the invention a light lever 6 is pivoted for example at 7 to the lever 3, and is adjusted to be attracted by the field magnet 2 at a very low voltage. The formation of lever 6 is such that its motion of attraction is considerably slower than that of lever 3. This may be effected by air resistance, for example by forming lever 6 out of thin flat material. The lever 6 is adapted to lock the lever 3 against attraction by the field magnet, for example by coming up against an abutment 8 formed on the latter.

The operation of this device is as follows:

If the motor circuit is closed and its operating current supplied (e. g. at a voltage higher than 15) the levers 3 and 6 are attracted by the field magnet, but the latter responds more slowly so that lever 3 reaches the magnet before lever 6 locks it. (Figure 3). The motor then commences to run in one direction, for example backwards.

If a very low current is supplied (e. g. at a voltage below 5) the lever 3 is not attracted, the current being insufficient, but the lever 6 is and locks the lever 3 (Figure 2). If the normal current is then reestablished (at a voltage over 15) the lever 3 cannot be attracted and the motor starts in the opposite direction to the preceding, that is to say runs forward.

A device 9 pivoted at 10 is adapted for holding the lever 6 immovable in one position or the other. This device 9 is operated by hand and its object is to allow only backward operation (Figure 1) or only forward operation (Figure 2) according to its position.

In the position shown in Figure 3 it does not interfere. This device 9 allows therefore of operating the motor to permit its working only in one direction.

Now on reference to Figures 4 and 5, a method of carrying out the motor control switch according to the invention will be seen.

The supply transformer is shown diagrammatically at 11, the speed regulating rheostat at 12, the motor supply conductors at 13, and a resistance to lower the voltage according to the invention at 14. A switch 15 is used to establish contact, when inclined, between the blade 16 and the wire 13. Further, when it is inclined towards the right (Figure 5) the switch 15 established contact between the wire 13 and the resistance 14 before establishing contact between the wire 13 and the blade 16.

The operation is therefore as follows:

In the position of Figure 4, the current is cut. To start the motor backwards, the switch is inclined towards the left (Figure 3) the effect of which is to send the operating current to the motor. If on the contrary it is wished to start the latter in the other direction the switch will be inclined towards the right (Figure 5) the effect of which will be to send first a current at low voltage which acts on the locking device and thereafter the operating current of the motor which then runs in the desired direction. The blade 16, is according to the invention, made in such a way that under the influence of heat it is deformed and a biasing spring 16' places the switch 15 in its position of rest, which opens the circuit. Consequently, if a short circuit is produced, the blade 16 is heated in consequence of the intensity of the current, is deformed, and automatically cuts the current.

The preceding description has been given only by way of example to make the invention understood, other modifications of the invention could be carried out without departing from its limits.

It is necessary to observe that, except in the case of separate supply, in shunt with the motor the device for changing the motion must not have any open circuit position so as not to interrupt the current in the magnet.

Whilst the device according to the invention may be intended chiefly for changing the motion of a motor, it can equally according to the invention be employed for another use (coupling of wagons in toy railways, etc.).

Having now particularly described and ascertained the nature of my said invention, and in what manner the same is to be performed, I declare that what I claim is:

1. A device of the character described comprising an electro-magnet, a lever pivoted at one of its end portions to said magnet, the free end portion of said lever disposed to be attracted by said electro-magnet, a second lever pivoted to the free end portion of said first mentioned lever and positioned to be attracted by said magnet when excited by a current insufficient to cause attraction of the first mentioned lever, and means arranged for engagement with said second lever when attracted by the electro-magnet to lock the first mentioned lever against subsequent attraction.

2. A device of the character described comprising a motor, a field magnet for said motor, a lever pivoted at one of its end portions to said magnet, the free end of said lever disposed to be attracted by said magnet, a second lever pivoted to the free end portion of said first mentioned lever and positioned to be attracted by said magnet when excited by a current insufficient to cause attraction of the first mentioned lever, and means arranged for engagement with said second lever when attracted by the field magnet to lock the first mentioned lever against subsequent attraction.

3. A device of the character described comprising an electro-magnet, a lever pivoted at one of its end portions to said magnet, the free end portion of said lever disposed to be attracted by said electro-magnet, a second lever pivoted to the free end portion of said first mentioned lever and positioned to be attracted by said magnet when excited by a current insufficient to cause attraction of the first mentioned lever, means arranged for engagement with said second lever when attracted by the electro-magnet to lock the first mentioned lever against subsequent attraction, and means adjustable to control said second lever.

4. A device of the character described comprising an electro-magnet, a lever pivoted at one of its end portions to said magnet, the free end portion of said lever disposed to be attracted by said electro-magnet, a second lever pivoted to the free end portion of the first mentioned lever and positioned to be attracted by said magnet when excited by a current insufficient to cause attraction of the first mentioned lever, means arranged for engagement with said second lever when attracted by the electro-magnet to lock the first mentioned lever against subsequent attraction, and a reversing switch connected to the first mentioned lever for operation thereby.

5. A device of the character described comprising a motor, a field magnet for said motor, an armature disposed to be attracted by said field magnet, and means between the armature and magnet and positioned to be attracted by the latter when excited by a current insufficient to cause attraction of said armature to lock the same against subsequent attraction.

6. A device of the character described comprising an electro-magnet, an armature disposed to be attracted by said electro-magnet, and means between said armature and electro-magnet and positioned to be attracted by the latter when excited by a current insufficient to cause attraction of the armature to lock the same against subsequent attraction.

7. A device of the character described comprising a motor, a field magnet for said motor, an armature disposed to be attracted by said magnet, means between said armature and magnet and positioned to be attracted by the latter when excited by a current insufficient to cause attraction of the armature to lock the same against subsequent attraction, and a switch interposed in the circuit of said motor and operable in one of its positions to close the circuit between the motor and the source of electric current intended to supply the motor, and, in its other position to first close the circuit between the motor and a source of electric current different from that intended to supply the motor and thereafter close the circuit between the motor and the source of current intended to supply the motor.

8. A device of the character described comprising a motor, a field magnet for said motor, an armature disposed to be attracted by said magnet, means between the armature and magnet and positioned to be attracted by the latter when excited by a current insufficient to cause attraction of the armature to lock the same against subsequent attraction, a switch interposed in the circuit of said motor and operable in one of its positions to close the circuit between the motor and the source of electric current intended to supply the motor, and, in its other position to first close the circuit between the motor and a source of electric current different from that intended to supply the motor and thereafter close the circuit between the motor and the source of current intended to supply the motor, and means associated with said switch to open the circuit upon an increased intensity in the current.

RENÉ TRUBERT.